UNITED STATES PATENT OFFICE.

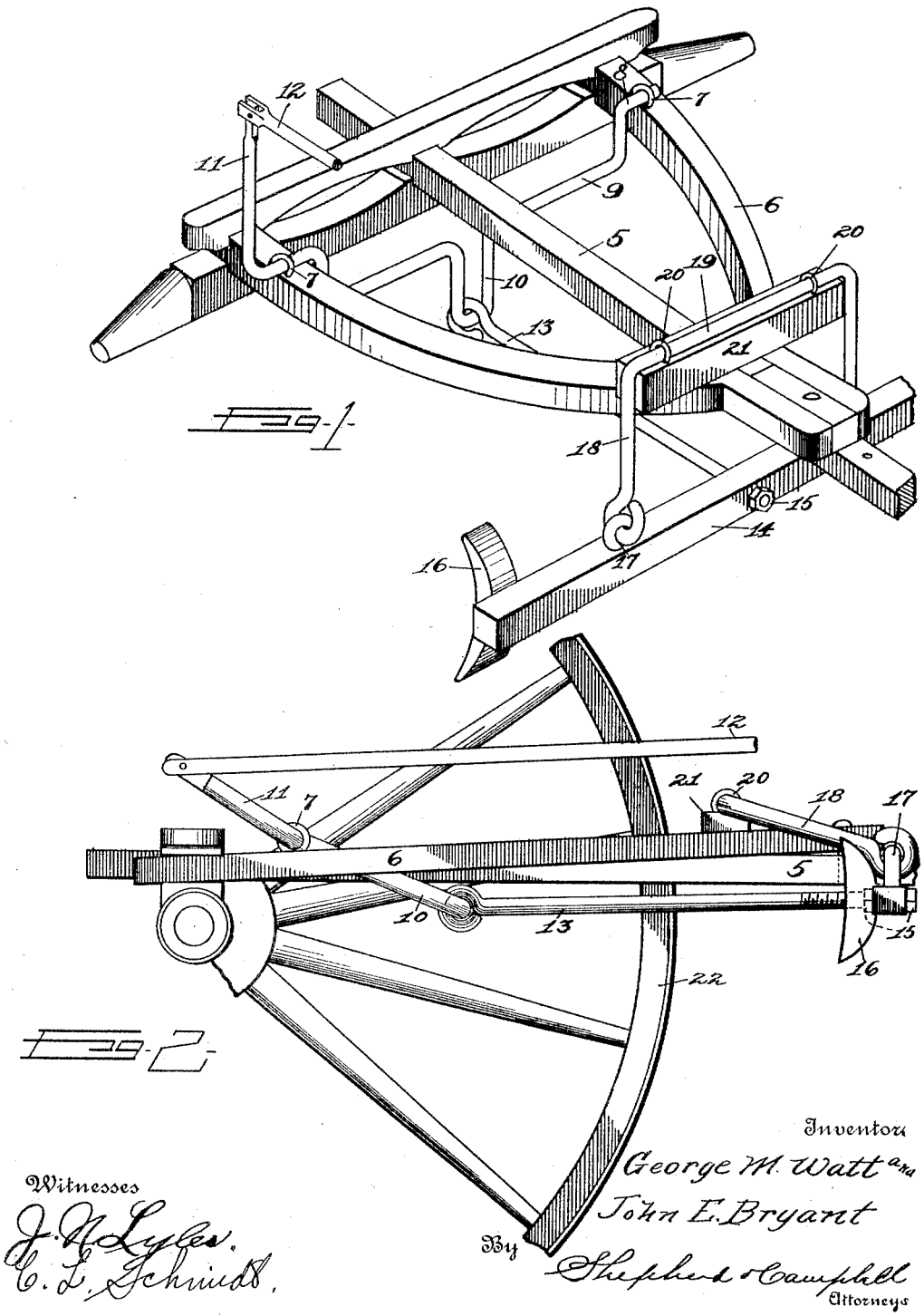

GEORGE M. WATT AND JOHN E. BRYANT, OF OAKLAND CITY, INDIANA.

WAGON-BRAKE.

1,108,533.    Specification of Letters Patent.    Patented Aug. 25, 1914.

Application filed May 20, 1912.  Serial No. 698,539.

*To all whom it may concern:*

Be it known that we, GEORGE M. WATT and JOHN E. BRYANT, citizens of the United States of America, residing at Oakland City, in the county of Gibson and State of Indiana, have invented certain new and useful Improvements in Wagon-Brakes, of which the following is a specification.

This invention relates to wagon brakes, and its object is to provide an improved device of this character comprising connections for the actuation of the brake beam and brake shoes, said connections being so constructed as to impart a very considerable throw to said beam and shoes, whereby the brake shoes may be held a considerable distance away from the wheels to thereby prevent the accumulation of mud upon said shoes.

It is a further object of the present invention to accomplish the foregoing objects by means of a very simple and economical structure, and one which may be employed in conjunction with wagons of the usual construction without the reach of the wagon interfering with the proper operation of the device.

Further objects and advantages of the invention will be set forth in the detailed description which now follows.

In the accompanying drawing, Figure 1 is a perspective view of a portion of a wagon, constructed in accordance with the invention, and Fig. 2 is a side elevation thereof with the near wheel removed.

Like numerals designate corresponding parts in all of the figures of the drawing.

Referring to the drawing, the numeral 5 designates the reach or connecting pole of a wagon, and 6 designates the hind hounds. Pivoted in keepers 7 carried by the hounds 6 is a transverse shaft 8, having an offset body portion 9 and having offset from the body portion 9, a crank 10. This crank 10 straddles the reach 5 when the parts are thrown to the position illustrated in Fig. 2, and consequently the reach in no wise interferes with the operation of the device. The transverse shaft 8 is provided with an upwardly extending crank arm 11, which has pivoted thereto, an operating rod 12. A link 13 pivotally engages crank 10, and at its forward end passes through a brake beam 14 and is secured in position by nuts 15.

Brake shoes 16 are carried by the brake beam 14, and this brake beam is provided with eyes 17 which are pivotally engaged with the ends of crank arms 18, said crank arms in turn being carried by a transverse shaft 19 that is journaled in keepers 20. These keepers are carried by a transverse block 21 supported from the hounds. It is apparent that if the rod 12 be drawn forward in Fig. 2, that the brake beam and brake shoes will be moved to bring the shoes into engagement with the tires of the wheels 22 to thereby brake the vehicle, but when the parts are thrown to the position illustrated in Fig. 2, the brake shoes are supported at such a distance from the tires of the vehicle as to effectually prevent the accumulation of mud or snow thereon. This is accomplished by providing the very considerable offset presented by crank 10 and offset 9 with relation to shaft 8 and this throw is had without interference of reach 5, owing to the fact that crank 10 straddles the reach, as hereinbefore set forth.

From the foregoing description it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview, such changes as may be made within the scope of the appended claim.

Having described our invention, what we claim is:—

In a wagon brake construction, the combination with a running gear comprising a centrally disposed reach and hounds between which said reach passes, of a block disposed transversely upon the upper face of said hounds adjacent the forward portion thereof, a substantially U-shape yoke having its central portion pivotally mounted upon the upper face of said block, and a brake beam flexibly connected to the free ends of the legs of said yoke, a centrally disposed rod rigidly connected to said beam and lying centrally beneath said reach, and an operating member bent from a single rod of metal to form transversely disposed members pivoted upon the upper face of said hounds, an offset portion which extends from one of said hounds to the other and which prevents transverse movement of said member by engagement with said hounds and an additional offset portion formed in the first named offset portion and centrally arranged to adapt it to straddle said reach, said last named offset portion constituting a crank with which said rod is pivotally connected.

In testimony whereof we affix our signatures in presence of two witnesses.

GEORGE M. WATT.
JOHN E. BRYANT.

Witnesses:
HUMPHREY C. HELDT,
JESSE F. BRYANT.

Copies of this patent may be obtained for five cents each, by addressing the "Commissioner of Patents, Washington, D. C."